United States Patent
Chen et al.

(10) Patent No.: US 12,016,001 B2
(45) Date of Patent: Jun. 18, 2024

(54) SLOT AGGREGATION METHOD AND DEVICE, SLOT AGGREGATION TRANSMISSION METHOD AND DEVICE, STORAGE MEDIUM, AND ELECTRONIC DEVICE

(71) Applicant: ZTE Corporation, Shenzhen (CN)

(72) Inventors: Yijian Chen, Shenzhen (CN); Zhaohua Lu, Shenzhen (CN); Fusheng Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 371 days.

(21) Appl. No.: 17/416,605

(22) PCT Filed: Dec. 23, 2019

(86) PCT No.: PCT/CN2019/127539
§ 371 (c)(1),
(2) Date: Jun. 21, 2021

(87) PCT Pub. No.: WO2020/125801
PCT Pub. Date: Jun. 25, 2020

(65) Prior Publication Data
US 2022/0061049 A1  Feb. 24, 2022

(30) Foreign Application Priority Data
Dec. 21, 2018 (CN) .......................... 201811573737.7

(51) Int. Cl.
*H04W 72/0446* (2023.01)
*H04L 5/00* (2006.01)
(Continued)

(52) U.S. Cl.
CPC ....... *H04W 72/0446* (2013.01); *H04L 5/0055* (2013.01); *H04W 72/0453* (2013.01);
(Continued)

(58) Field of Classification Search
CPC ......... H04W 72/0446; H04W 72/0453; H04W 72/046; H04L 5/0055; H04L 5/0037; H04L 5/0042; H04B 7/0695
See application file for complete search history.

(56) References Cited

U.S. PATENT DOCUMENTS 7,623,589 B2 * 11/2009 Oyman ................ H04B 7/0452
375/267
2018/0270022 A1   9/2018 Sun et al.
(Continued)

FOREIGN PATENT DOCUMENTS

CN   108811115 A   11/2018
CN   108811118 A   11/2018
(Continued)

OTHER PUBLICATIONS

International Search Report for corresponding application PCT/CN2019/127539 filed Dec. 23, 2019; dated Mar. 11, 2020.
(Continued)

*Primary Examiner* — Inder P Mehra
(74) *Attorney, Agent, or Firm* — CANTOR COLBURN LLP

(57) ABSTRACT

Provided are a slot aggregation and device, a slot aggregation transmission method and device, a storage medium, and an electronic device. The slot aggregation method includes: setting, in a slot aggregation process, one or more slot intervals in N slots, wherein a duration of each slot interval is one or more slots; or setting, in a slot aggregation process, N slots as continuous slots, wherein the number of resources allocated in an nth slot of the N slots is less than the number of resources allocated in the (n−1)th slot; or setting, in a slot aggregation process, N slots as X slot groups, wherein a transmission format of each slot group is pre-configured by
(Continued)

Transmit code block groups (CBGs) to a terminal on N slots after slot aggregation, wherein one or more slot intervals are set in the N slots after slot aggregation, a duration of one slot interval is one or more slots, N is an integer greater than 1, and each CBG includes a plurality of code blocks (CBs) — S802

Receive in the one or more slot intervals, feedback information from the terminal, wherein the feedback information received in a slot interval is used for indicating whether the terminal successfully decodes CBGs transmitted before the slot interval — S804

In a process of transmitting the CBGs, adjusting, according to the feedback information, resources for transmitting CBGs on one or more slots after the slot interval — S806 a base station, N is an integer greater than 1 and less than or equal to n, and X is less than N.

9 Claims, 5 Drawing Sheets

(51) Int. Cl.
*H04W 72/044* (2023.01)
*H04W 72/0453* (2023.01)

(52) U.S. Cl.
CPC ......... *H04W 72/046* (2013.01); *H04L 5/0037* (2013.01); *H04L 5/0042* (2013.01)

(56) References Cited

U.S. PATENT DOCUMENTS

2018/0317225 A1 11/2018 Akkarakaran et al.
2018/0368137 A1 12/2018 Yin et al.

FOREIGN PATENT DOCUMENTS

| CN | 108811152 A | 11/2018 |
| GB | 2317538 A | 3/1998 |
| WO | 2018041251 A1 | 3/2018 |
| WO | 2018132686 A1 | 7/2018 |
| WO | 2018174761 A1 | 9/2018 |

OTHER PUBLICATIONS

European Search Report for corresponding application EP19900646; Dated Jan. 3, 2022.
Huawei, HiSilicon, "Scheduling scheme for slot aggregation", 3GPP TSG RAN WG1 Meeting #88bis Spokane, USA Apr. 3-7, 2017, R1-1705067.
Huawei, HiSilicon, "Slot based scheduling for data channels", 3GPP TSG RAN WG1 Meeting #89, R1-1708150, Hangzhou, China, May 15-19, 2017.
Nokia, Alcatel-Lucent Shanghai Bell, On PDSCH/PUSCH scheduling intervals and slot aggregation, 3GPP TSG-RAN WG1#89, Hangzhou, P.R. China, May 15-19, 2017, R1-1708520.

* cited by examiner

Fig. 4

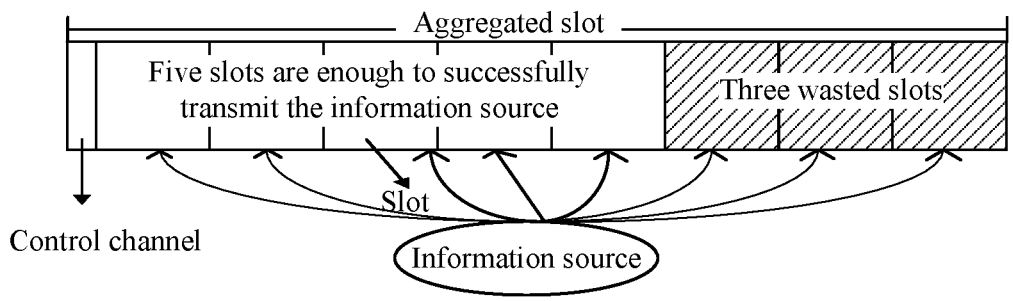

Fig. 5

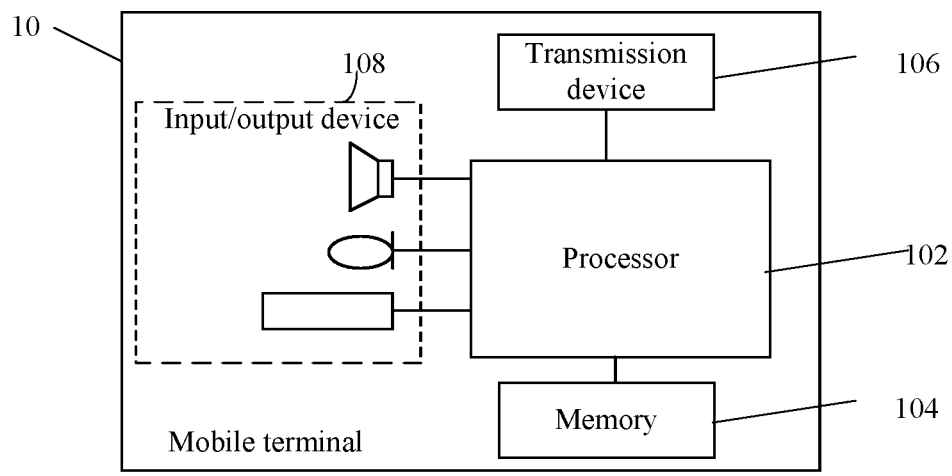

Fig. 6

| Set, in a slot aggregation process, one or more slot intervals in N slots, wherein a duration of one slot interval is one or more slots, and N is an integer greater than 1 | S602 | or

| Set, in a slot aggregation process, N slots as continuous slots, wherein the number of resources allocated in an nth slot of the N slots is less than the number of resources allocated in an (n-1)th slot of the N slots, and n is less than or equal to N | S604 | or

| Set, in a time-slot aggregation process, N slots as X slot groups, wherein a transmission format of each slot group is pre-configured by a base station, and X is less than N | S606 |

Fig. 7

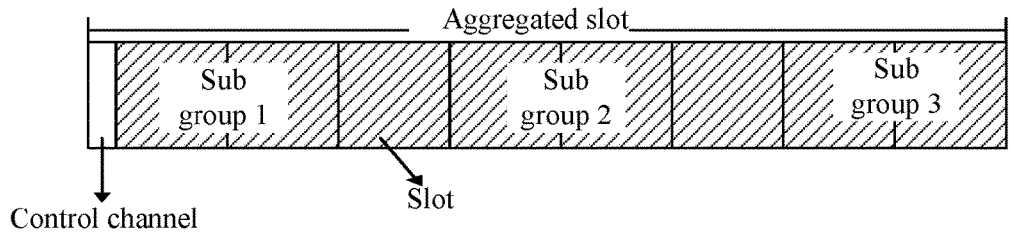

Fig. 8

| Transmit code block groups (CBGs) to a terminal on N slots after slot aggregation, wherein one or more slot intervals are set in the N slots after slot aggregation, a duration of one slot interval is one or more slots, N is an integer greater than 1, and each CBG includes a plurality of code blocks (CBs) | S802 |
|---|---|
| Receive in the one or more slot intervals, feedback information from the terminal, wherein the feedback information received in a slot interval is used for indicating whether the terminal successfully decodes CBGs transmitted before the slot interval | S804 |
| In a process of transmitting the CBGs, adjusting, according to the feedback information, resources for transmitting CBGs on one or more slots after the slot interval | S806 |

Fig. 9

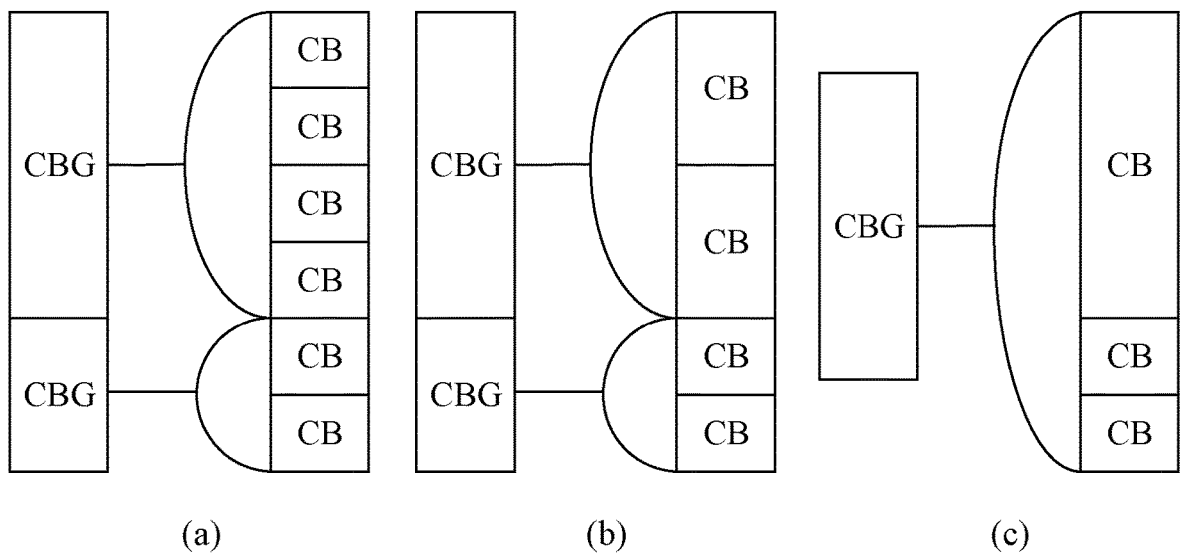

SLOT AGGREGATION METHOD AND DEVICE, SLOT AGGREGATION TRANSMISSION METHOD AND DEVICE, STORAGE MEDIUM, AND ELECTRONIC DEVICE

The present disclosure is a National Stage Filing of the PCT International Application No. PCT/CN2019/127539 filed on Dec. 23, 2019, which claims the priority of Chinese Patent Application No. 201811573737.7, filed to the China National Intellectual Property Administration on Dec. 21, 2018, the disclosure of which is incorporated herein by reference in its entirety.

TECHNICAL FIELD

The present disclosure relates to the field of communications, and for example, to a slot aggregation method and device, a slot aggregation method and device, a storage medium, and an electronic device.

BACKGROUND

Slot aggregation transmission, as an efficient transmission manner, mainly includes two types of slot aggregation. The first type of slot aggregation is that information transmitted in different slots corresponds to the same source data block, as shown in FIG. 1. The second type of slot aggregation is that information transmitted in different slots corresponds to different source data blocks, as shown in FIG. 2.

Since slot aggregation transmission does not require control signaling to be transmitted in each slot where data is transmitted to implement independent resource scheduling and transmission parameter indication of each slot, and thus regardless of which type of slot aggregation is used, the effect of saving the overhead of the control signaling can be achieved, thereby improving the resource utilization efficiency.

In order to save the overhead of the control signaling, the slot aggregation mode is used, and in order to have a small influence on the transmission performance, the slot aggregation mode can generally be applied to a scenario in which a channel condition changes slowly. The channel condition herein includes a channel response magnitude and an interference level. Because of high redundancy, the first type of slot aggregation may also be used in a scenario in which a channel condition changes fast, and this type of slot aggregation may bring about a combination gain and a classification gain through multiple transmissions, thereby improving robustness.

As shown in FIG. 3, the first type of slot aggregation and the second type of slot aggregation are aggregated and mixed. Information transmitted in some slots corresponds to the same source data blocks, for example, an information source 1 is transmitted in a slot 1 and a slot 2, the slot 1 and the slot 2 correspond to the same source data blocks. Information transmitted in the aggregated slots corresponds to a plurality of source data blocks, for example, the information source 1, an information source 2, . . . , and an information source y may be transmitted in the aggregated slots.

In the slot aggregation technology, resources and transmission parameters among various slots are the same, this mode is relatively simple, but also has some loss of flexibility; therefore, compared with non-aggregation cases, the transmission performance still has a certain loss. An optimal resource and an optimal transmission parameter cannot be used in each slot, and therefore there is a room for optimization. In addition, the number of aggregated slots is generally fixed, and therefore this mode also lacks flexibility and affects transmission efficiency.

The slot aggregation is generally a continuous slot aggregation structure, that is to say, the aggregated slots are continuous in time until a slot aggregation is completed. In this method, when there is some feedback information in a transmission process, as there is a certain delay in calculation and preparation of the feedback information, data may have been correctly transmitted before this period of time, and there is no need to perform slot aggregation transmission, or the transmission efficiency is not very high if the previous transmission parameters are continuously used, and there is an obvious waste in resources.

As shown in FIG. 4, acknowledgement/non-acknowledgement (ACK/NACK) feedback or other types of feedback may terminate the slot aggregation in advance. A simple and easy implementation method for the termination in advance is that a base station terminates transmission when receiving an ACK fed back by user equipment (UE). However, the ACK feedback may have a delay, the continuous transmission during the delay may waste resources, and therefore there is a room for optimization.

For the problem in the related art that the transmission efficiency is low in slot aggregation due to the poor flexibility caused by the fact that the resources and the transmission parameters in various slots are the same, no solution has been proposed.

SUMMARY

The embodiments of the present disclosure provide a slot aggregation and device, a slot aggregation transmission method and device, a storage medium, and an electronic device, which may at least solve the problem in the related art that the transmission efficiency is low in slot aggregation due to the poor flexibility caused by the fact that the resources and the transmission parameters in various slots are the same.

According to some embodiments of the present disclosure, provided is a slot aggregation method, including:
  setting, in a slot aggregation process, one or more slot intervals in N slots, wherein a duration of one slot interval is one or more slots, and N is an integer greater than 1; or
  setting, in a slot aggregation process, N slots as continuous slots, wherein the number of resources allocated in an nth slot of the N slots is less than the number of resources allocated in an (n−1)th slot of the N slots, and n is less than or equal to N; or
  setting, in a slot aggregation process, N slots as X slot groups, wherein a transmission format of each slot group is pre-configured by a base station, and X is less than N.

According to some other embodiments of the present disclosure, provided is a slot aggregation transmission method, including:
  transmitting code block groups (CBGs) to a terminal on N slots after slot aggregation, wherein one or more slot intervals are set in the N slots after slot aggregation, a duration of one slot interval is one or more slots, N is an integer greater than 1, and each CBG includes a plurality of code blocks (CBs);
  receiving, in the one or more slot intervals, feedback information from the terminal, wherein the feedback information received in a slot interval is used for indicating whether the terminal successfully decodes CBGs transmitted before the slot interval; and in a process of transmitting the CBGs, adjusting, according to the feedback information, resources for transmitting CBGs on one or more slots after the slot interval.

According to some other embodiments of the present disclosure, provided is a slot aggregation transmission method, including:

setting aggregated slots as T slot sub-groups;

configuring beams for the T slot sub-groups; and transmitting the T slot sub-groups by the configured beams, wherein T is an integer greater than 2.

According to some other embodiments of the present disclosure, provided is a slot aggregation transmission method, including:

setting aggregated slots as T slot sub-groups;

configuring panels for the T slot sub-groups; and transmitting the T slot sub-groups by the configured panels, wherein T is an integer greater than 2.

According to some other embodiments of the present disclosure, provided is a slot aggregation device, including:

a first setting module, configured to set, in a slot aggregation process, one or more slot intervals in N slots, wherein a duration of one slot interval is one or more slots, and N is an integer greater than 1; or a second setting module, configured to set, in a slot aggregation process, N slots as continuous slots, wherein the number of resources allocated in an nth slot of the N slots is less than the number of resources allocated in an (n−1)th slot of the N slots, and n is less than or equal to N; or a third setting module, configured to set, in a slot aggregation process, N slots as X slot groups, wherein a transmission format of each slot group is pre-configured by a base station, and X is less than N.

According to some other embodiments of the present disclosure, provided is a slot aggregation transmission device, including:

a transmission module, configured to transmit code block groups (CBGs) to a terminal on N slots after slot aggregation, wherein one or more slot intervals are set in the N slots after slot aggregation, a duration of one slot interval is one or more slots, N is an integer greater than 4, each CBG includes a plurality of code blocks (CBs), and different CBGs are transmitted by different resources within the slots;

a receiving module, configured to receive, in the one or more slot intervals, feedback information from the terminal, wherein the feedback information received in a slot interval is used for indicating whether the terminal successfully decodes CBGs transmitted before the slot interval; and an adjusting module, configured to adjust, in a process of transmitting the CBGs and according to the feedback information, resources for transmitting CBGs on one or more slots after the slot interval.

According to some other embodiments of the present disclosure, provided is a slot aggregation transmission device, including:

a fourth setting module, configured to set aggregated slots as T slot sub-groups;

a first configuration module, configured to configure beams for the T slot sub-groups; and a first transmitting module, configured to transmit the T slot sub-groups by the configured beams, wherein T is an integer greater than 2.

According to some other embodiments of the present disclosure, provided is a slot aggregation transmission device, including:

a fifth setting module, configured to set aggregated slots as T slot sub-groups;

a second configuration module, configured to configure panels for the T slot sub-groups; and a second transmitting module, configured to transmit the T slot sub-groups by the configured panels, wherein T is an integer greater than 2.

According to some other embodiments of the present disclosure, provided is a storage medium. The storage medium stores a computer program. The computer program is configured to execute the operations in any one of the method embodiments at runtime.

According to some other embodiments of the present disclosure, provided is an electronic device, including a memory and a processor, wherein the memory stores a computer program, and the processor is configured to run the computer program, so as to execute the operations in any one of the method embodiments.

In the embodiments of the present disclosure, in a slot aggregation process, by setting one or more slot intervals in N slots, wherein a duration of one slot interval is one or more slots; or by setting N slots as continuous slots, wherein the number of resources allocated in an nth slot of the N slots is less than the number of resources allocated in an (n−1)th slot of the N slots, and n is less than or equal to N; or by setting N slots as X slot groups, wherein a transmission format of each slot group is pre-configured by a base station, resources and/or transmission parameters are enabled to be different between various slots, so that the slot aggregation mode is flexible. By virtue of the solution, the problem in the related art that the transmission efficiency is low in slot aggregation due to the poor flexibility caused by the fact that the resources and the transmission parameters in various slots are the same is solved, and the slot aggregation mode is flexible, so that the transmission efficiency may be improved during transmission.

BRIEF DESCRIPTION OF THE DRAWINGS

FIG. 4 is a first schematic diagram IV of the structure of aggregated slots according to a related technology;

FIG. 5 is a structural block diagram of hardware of a mobile terminal for implementing a slot aggregation method according to the embodiments of the present disclosure;

FIG. 6 is a flowchart of a slot aggregation method according to the embodiments of the present disclosure;

FIG. 7 is a schematic diagram of slot aggregation according to the embodiments of the present disclosure;

FIG. 8 is a flowchart I of a slot aggregation transmission method according to the embodiments of the present disclosure;

FIG. 9 is a schematic diagram of slot aggregation hybrid transmission according to the embodiments of the present disclosure;

DETAILED DESCRIPTION

Figure 1:
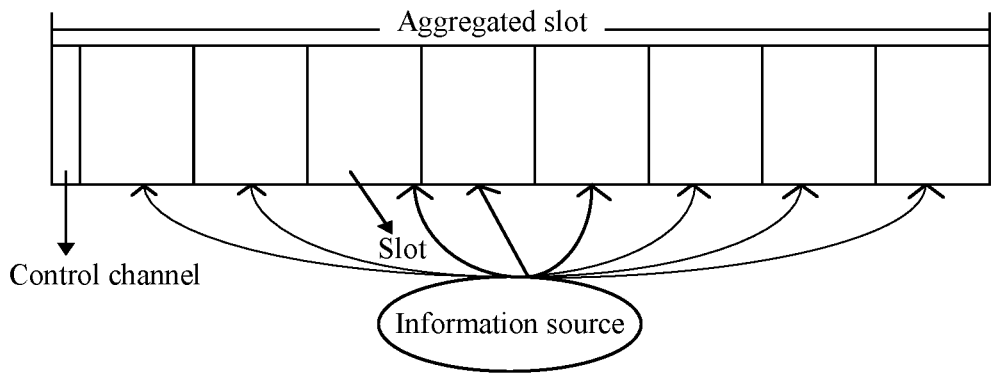
FIG. 1 is a schematic diagram I of the structure of aggregated slots according to a related technology.
Figure 2:
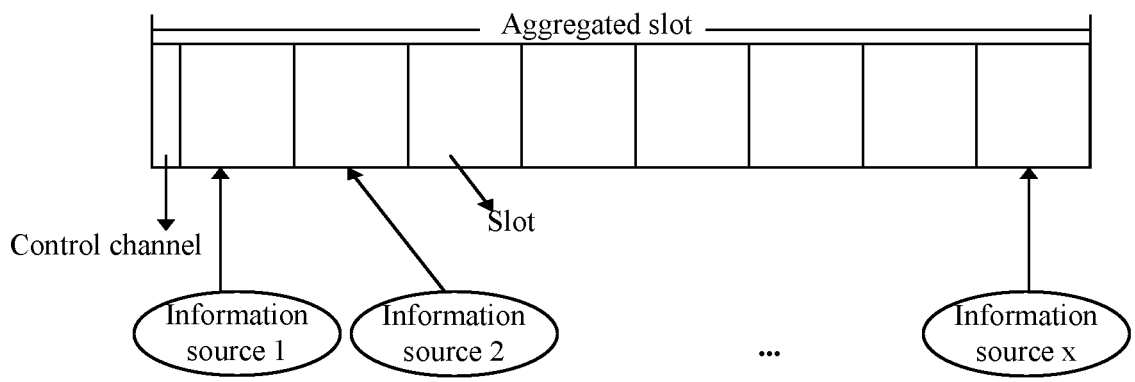
FIG. 2 is a schematic diagram II of the structure of aggregated slots according to a related technology.
Figure 3:
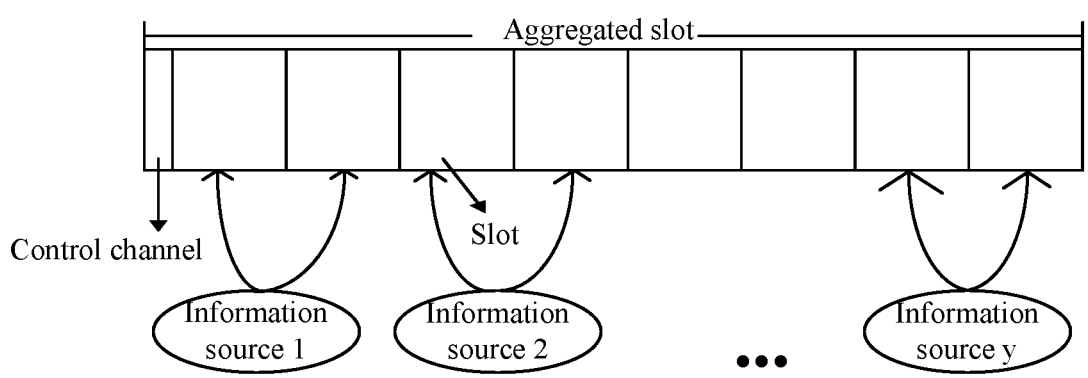
FIG. 3 is a schematic diagram III of the structure of aggregated slots according to a related technology.

The present disclosure will be described in detail below using some embodiments with reference to the accompanying drawings.

It should be noted that the terms "first", "second" etc., in the description, claims, and accompanying drawings of the present disclosure are used to distinguish similar objects, and are not necessarily used to describe a specific sequence or order.

Embodiment 1

The method embodiment provided in the embodiment 1 of the present disclosure may be implemented in a mobile terminal, a computer terminal, or a similar computing device. Taking the operation on a mobile terminal as an example, FIG. 5 is a structural block diagram of hardware of a mobile terminal for implementing a slot aggregation method according to the embodiments of the present disclosure. As shown in FIG. 5, a mobile terminal 10 may include one or more processors 102 (only one is shown in FIG. 5) (the processor 102 may include, but is not limited to, a processing device such as a microprocessor (MCU) or a programmable logic device (FPGA)) and a memory 104 for storing data. In some embodiments, the mobile terminal above can further include a transmission device 106 for a communication function and an input/output device 108. Those ordinarily skilled in the art can appreciate that the structure shown in FIG. 5 is for illustrative purposes only, but not limit the structure of the mobile terminal. For example, the mobile terminal 10 may also include more or fewer components than that shown in FIG. 5, or have a different configuration than that shown in FIG. 5.

The memory 104 can be used for storing a computer program, for example, software programs and modules of application software, such as program instructions/modules corresponding to the slot aggregation method in the embodiment of the present disclosure; and the processor 102 runs the software programs stored in the memory 104, so as to execute various function applications and data processing, that is, to implement the method above. The memory 104 may include a high-speed random access memory, and may also include non-volatile memories, such as one or more magnetic storage devices, flash memories, or other non-volatile solid-state memories. In some instances, the memory 104 may further include a memory remotely located from the processor 102, and the remote memory may be connected to the mobile terminal 10 by a network. Examples of the network above includes, but is not limited to, an Internet, intranets, a local area network, a mobile communication network, and combinations thereof.

The transmission device 106 is configured to receive or transmit data by a network. Specific examples of the network may include a wireless network provided by a communication provider of the mobile terminal 10. In an example, the transmission device 106 may include a network interface controller (NIC) that may be coupled to other network devices by a base station, so as to communicate with the Internet. In an example, the transmission device 106 can be a radio frequency (RF) module for communicating wirelessly with the Internet.

The present embodiment provides a slot aggregation method, which is applied to a base station. After slot aggregation, the aggregated slots may be transmitted to the above mobile terminal. FIG. 6 is a flowchart of a slot aggregation method according to the embodiments of the present disclosure. As shown in FIG. 6, the method includes the following operations.

In operation S602, one or more slot intervals are set in N slots setting in a slot aggregation process, wherein a duration of one slot interval is one or more slots, and N is an integer greater than 1. Alternatively, in operation S604, N slots are set as continuous slots in a slot aggregation process, wherein the number of resources allocated in an nth slot of the N slots is less than the number of resources allocated in an (n−1)th slot of the N slots, and n is less than or equal to N. Alternatively, in operation S606, N slots are set as X slot groups in a time-slot aggregation process, wherein a transmission format of each slot group is pre-configured by a base station, and X is less than N.

In some embodiments, the operation S602 may include: setting, in the slot aggregation process, M spaced sub-aggregation blocks in the N slots, wherein the slot intervals between the M sub-aggregation blocks are the same; or setting, in the slot aggregation process, M spaced sub-aggregation blocks in the N slots, wherein a slot interval between an (m−2)th sub-aggregation block and an (m−1)th sub-aggregation block is less than a slot interval between the (m−1)th sub-aggregation block and an mth sub-aggregation block; or setting, in the slot aggregation process, M spaced sub-aggregation blocks in the N slots, wherein the number of slots included in an (m−1)th sub-aggregation block is less than the number of slots included in an mth sub-aggregation block, m being less than or equal to M, and M being less than N.

In some embodiments of the present disclosure, the one or more slot intervals are used for receiving feedback information of a terminal in a process of transmitting aggregated slots to the terminal, so as to determine, according to the feedback information, to release or continue transmission of slots to be transmitted among the aggregated slots, wherein the feedback information is used for indicating whether the terminal successfully decodes the transmitted slots.

Resources of the one or more slot intervals are used for transmitting other transmission blocks or for scheduling other terminals other than a current terminal.

In some embodiments of the present disclosure, the resources include one of the following: time domain resources, frequency domain resources, power resources or space domain resources.

In some embodiments, before the aggregated slots are transmitted or each slot group is transmitted, a configured transmission format of each slot group is transmitted to the terminal.

In some embodiments of the present disclosure, after an (x−1)th slot group is transmitted, a transmission format of an xth slot group or an (x+1)th slot group fed back by the terminal, is received; and the transmission format is configured as a transmission format of the xth slot group or the (x+1)th slot group.

Hereinafter detailed descriptions will be given to the present disclosure in connection with the exemplary embodiments of the present disclosure.

The slot aggregation in the embodiments of the present disclosure is mainly implemented in the following modes.

Mode 1: introducing a new slot aggregation structure

A simple structure is dividing a transmission into several segments, waiting for a certain time each time transmission of a segment is completed, and determining to release or continue the transmission after receiving the ACK/NACK. For example, a slot aggregation structure may be 1111000011110000111110000, in which 1 indicates an aggregated slot, and 0 indicates a non-aggregated slot. An ACK/NACK feedback may be triggered upon conversion of 1 and 0. This structure may correspond to discrete slot aggregation, which has non-continuity. There are many other implementations for discontinuous slot aggregation.

For another example, a non-continuous slot aggregation structure may be 1111 0101 0101 0101 or 1111 0101 0001, in which 1 represents an aggregated slot and 0 represents a non-aggregated slot. The characteristic of this non-continuous slot aggregation structure is that, the same slot aggregation block is divided into multiple spaced sub-aggregation blocks, for example, 1111 0101 0101 0101 or 1111 0101 0001 is a slot aggregation block, the positions of 1 correspond to sub-aggregation blocks, i.e. the slot aggregation block includes a plurality of sub-aggregation blocks, and there is one or more non-aggregated slots between the plurality of sub-aggregation blocks, that is, non-aggregated slots are inserted as space among the plurality of sub-aggregation blocks, and the spacing of the sub-aggregation blocks may become larger over time.

For another example, a non-continuous slot aggregation structure may be 1111 0111 0110 1010, in which 1 represents an aggregated slot, and 0 represents a non-aggregated slot. The characteristic of this non-continuous slot aggregation structure is that, the same slot aggregation block is divided into a plurality of spaced sub-aggregation blocks, and in cases where the transmission interval remains fixed, the number of slots contained in the sub-aggregation block becomes smaller over time.

In this mode, other UEs, which may be non-aggregated UEs or aggregated UEs, may be dispatched at the locations of 0. It should be noted that, the foregoing example only provides a case in which the feedback interval for decoding the state information ACK/NACK is one slot, and if more slots are required for decoding and determination, one 0 may be extended to a plurality of 0, for example, '0'→'0000'.

In such a new slot structure configuration, the slot resource may be released to another transmission block process or another terminal, therefore the resource utilization rate is high.

Mode 2: the slot aggregation structure is still a completely continuous 1111111111 structure, but the number of the allocated resources is gradually reduced. The allocated resources may be symbol resources or resource block (RB) resources. For example, the number of RBs may be 8, 4, 2, 2, 1, 1, 1, 1, or 8, 8, 4, 4, 2, 2, 1, 1 in a descending order. This is because, the later transmission would be added with additional information on the basis of the original information, and therefore would be easier to decode successfully. If the ACK/NACK is fed back relatively evenly rather than fed back at any time, this method can reduce the waste of resources.

Based on similar concept, in addition to the time-domain symbol resources or the frequency-domain RB resources, the power resources or the number of the space domain resources "beams or antennas" may also be gradually decreased.

Mode 3: FIG. 7 is a schematic diagram of time-slot aggregation according to the embodiments of the present disclosure. As shown in FIG. 7, slots are divided into multiple groups, and transmission is performed in each slot group according to a transmission format. The transmission format mainly includes a slot aggregation state consisting of 1 and 0. The transmission format may be determined according to the feedback of a terminal or may be configured by a base station. The transmission format may be configured for a slot group or a slot sub-group, wherein the slot group is further divided into slot sub-groups.

The transmitting end may configure a slot aggregation structure (a slot aggregation format) and indicate the corresponding slot aggregation structure to the peer end. The slot aggregation structure may be a discrete aggregation or continuous structure. If there are a plurality of slot sub-groups, the grouping manner may also be indicated. For the discrete aggregation, the positions of 1 and 0 may also be indicated.

The slot aggregation structure in the embodiments of the present disclosure is more flexible, and the parameters of the slot sub-groups in the slot aggregation can be determined dynamically. For example, when there is a sufficient time interval between the sub-group x and the sub-group y for feedback, the UE may perform feedback after the transmission of the sub-group x is completed and before the transmission of the sub-group y is started, so as to suggest an aggregation structure or aggregation parameters of the sub-group y by means of the feedback.

After the transmission of the sub-group x is completed, the receiving terminal can determine the resources required for subsequent transmission according to the transmission condition of the sub-group x. If fewer resources are required, the number of occupied slots in the sub-group y can be reduced. Conversely, if more resources are required, it may be advised to occupy all of the slots of sub-group y. It should be noted that, since it takes time to calculate the transmission condition of the sub-group x, the advice to the sub-group y can be given only when there is enough time interval, but the time interval between adjacent sub-groups is not enough in general.

Embodiment 2

Some embodiments of the present disclosure provide a slot aggregation transmission method. FIG. 8 is a flowchart I of a slot aggregation transmission method according to the embodiments of the present disclosure. As shown in FIG. 8, the method includes the following operations. In operation S802, code block groups (CBGs) are transmitted to a terminal on N slots after slot aggregation, wherein one or more slot intervals are set in the N slots after slot aggregation, a duration of one slot interval is one or more slots, N is an integer greater than 1, and each CBG includes a plurality of code blocks (CBs). In operation S804, feedback information from the terminal is received in the one or more slot intervals, wherein the feedback information received in a slot interval is used for indicating whether the terminal successfully decodes CBGs transmitted before the slot interval. In operation S806, in a process of transmitting the CBGs, resources for transmitting CBGs on one or more slots after the slot interval are adjusted according to the feedback information.

In the embodiments of the present disclosure, different CBGs are transmitted by different resources in the slot.

In the embodiments of the present disclosure, in a slot aggregation process, the N slots are set as Y slot sub-groups, wherein each slot sub-group includes one or more slots, and the CBGs are transmitted by the Y slot sub-groups, Y being an integer greater than 1.

In some embodiments, after transmission of the (y−1)th slot sub-group is completed, the feedback information from the terminal is received by the yth slot sub-group, wherein the feedback information is used for indicating whether the terminal successfully decodes the CBGs transmitted in the (y−1)th slot sub-group; according to the feedback information, resources corresponding to successfully decoded CBGs in the (y+1)th slot sub-group are allocated to unsuccessfully decoded CBGs; or, according to the feedback information, resources corresponding to successfully decoded CBGs in the (y+1)th slot sub-group are allocated to other terminals than the terminal; or according to the feedback information, resources corresponding to successfully decoded CBGs in the (y+1)th slot sub-group are allocated to other transmission blocks (TBs).

In the embodiments of the present disclosure, the operation of allocating, according to the feedback information, the resources corresponding to the successfully decoded CBGs in the (y+1)th slot sub-group to the unsuccessfully decoded CBGs may include: mapping the successfully decoded CBGs to resources corresponding to the successfully decoded CBGs; or performing coding adjustment on the unsuccessfully decoded CBGs, and then mapping the unsuccessfully decoded CBGs to the (y+1)th slot sub-group as a whole.

In the embodiments of the present disclosure, in the slot aggregation transmission, there may be one or more CBs in a transmission block. When there are multiple CBs, the size and number of CBs included in the CBGs are usually very close. FIG. 9 is a schematic diagram of slot aggregation hybrid transmission according to the embodiments of the present disclosure. As shown in FIG. 9, in cases where one CBG includes a plurality of CBs, it is possible that some CBs have been transmitted correctly, while some CBs are not transmitted correctly.

The most ideal situation is that each CB has a corresponding ACK/NACK feedback. However, considering that the practical overhead for ACK/NACK feedback is limited, it is possible that a CBG constituted by a plurality of CBs corresponds to one ACK/NACK feedback; if all the CBs in the CBG are transmitted correctly, an ACK is fed back; and if there is an erroneous CB in the CBG, an NACK is fed back.

There is a case of waste of overhead in the slot aggregation transmission process. In the slot aggregation transmission process, when some CBs or CBGs have been correctly transmitted and some CBs or CBGs still need to be transmitted continuously, if the resource allocation does not change in this situation, there will be a waste of resources.

As shown in Table 1, a slot aggregation transmission is used to transmit TBi, wherein the TBi includes two CBGs, one CBG being TBi_CBG1, and the other one being TBi_CBG2. TBi_CBG1 is transmitted in a slot using a resource 1, and TBi_CBG2 is transmitted in a slot using a resource 2. In a sub-group a, resources in a slot will not change. Feedback is performed after the transmission of the slot sub-group a is completed, the time required for feedback calculation and preparation is the slot sub-group b, and the resources 1 and 2 in a slot corresponding to the slot sub-group 2 can be allocated to other UEs or other TBs; and it is determined, according to the feedback, that the CBG1 has not been correctly transmitted and the CBG2 has been correctly transmitted.

TABLE 1

| | slot | | | | |
| --- | --- | --- | --- | --- | --- |
| | slot 1 | slot 2 | slot 3, slot 4 | slot 5 | slot 6 |
| | | | slot sub-group | | |
| | slot sub-group a | | slot sub-group b | slot sub-group c | |
| resource 1 in a slot | TBi_CBG1 | TBi_CBG1 | No TBi_CBG1, 2 | TBi_CBG1 | TBi_CBG1 |
| resource 2 in a slot | TBi_CBG2 | TBi_CBG2 | No TBi_CBG1, 2 | TBi_CBG2 TBj | TBi_CBG2 TBj |

Because CBG2 has been transmitted correctly, there is no need to transmit TBi_CBG2 again. After acquiring the information, how to process the resource 2 in the slot can be determined by the transmitting end so as to effectively utilize the resources. The conventional way is to release the resource 2 in slots 5 and 6 in the slot sub-group c for transmission by other UEs. Since it is uncertain whether there are other active UEs, the released resources may not be fully utilized. In view of this, after learning that CBG2 has been correctly transmitted, transmission resources corresponding to CBGs, which has been correctly transmitted, can be used for CBGs which are not correctly transmitted. For example, the resource 2 in slots 5 and 6 in the slot sub-group c can be used for transmitting TB i_CBG1. If the CBG1 and the CBG2 are equal or similar in size and the resources 1 and 2 in the slot are also the same or similar in size, the CBG1 may be mapped directly to the resource 2 in the slot. If there is a large difference, the CBG1 may be adjusted by encoding, and then mapped to a set of resources 1 and 2 as a whole. In this way, the control signaling does not need to be transmitted to perform resource scheduling and allocation, and the CBG1 may be mapped to the resource 2 in the slot in an agreed manner. Another method is to use the resources to transmit TBj of the same UE, which can also optimize resource utilization rate, wherein TBj can be prepared according to a predetermined manner or a pre-configured manner.

It should be noted that, if the CBG1 corresponds to the NACK and the CBG2 corresponds to the ACK, in subsequent transmission, resource 2 in the slot is used for transmission of CBG1, which means that the CBG1 may be received more quickly and correctly. Therefore, once this situation occurs, the number of subsequent slot sub-groups and a feedback time point may change accordingly.

Embodiment 3

Figure 10:
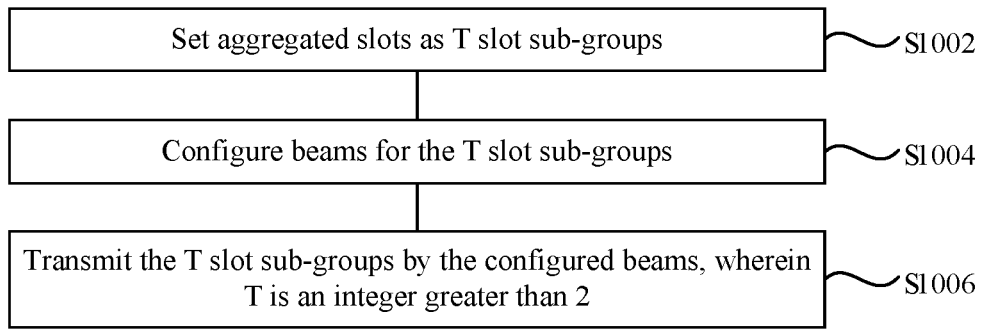
FIG. 10 is a flowchart II of a slot aggregation transmission method according to the embodiments of the present disclosure.

Some embodiments of the present disclosure provide a slot aggregation transmission method. FIG. 10 is a flowchart II of a slot aggregation transmission method according to the embodiments of the present disclosure. As shown in FIG. 10, the method includes the following operations.

In operation S1002, aggregated slots are set as T slot sub-groups.

In operation S1004, beams are configured for the T slot sub-groups.

In operation S1006, the T slot sub-groups are transmitted by the configured beams, wherein T is an integer greater than 2.

In some embodiments, the operation S1002 may include: setting a first beam or a first beam group for the T slot sub-groups, wherein the first beam group includes a plurality of beams, and the plurality of beams are used for transmitting x1 slots in the slot sub-groups, and x1 is a positive integer.

In some embodiments, the operation S1006 may include: transmitting the T slot sub-groups by the configured first beam or first beam group.

In some other embodiments, the operation S1006 may further include: after transmitting the (t−1)th slot sub-group by the configured first beam or first beam group, receiving feedback information, fed back by the terminal, of transmitting the t-th slot sub-group by a second beam or a second beam group; configuring, according to the feedback information, the second beam or the second beam group for the t-th slot sub-group; and transmitting the t-th slot sub-group by the second beam or the second beam group, wherein the second beam group includes a plurality of beams, and the plurality of beams are used for transmitting x2 slots in the slot sub-group, where t is an integer greater than or equal to 1, and less than T, and x2 is a positive integer.

In some other embodiments, the operation S1006 may further include: in a case of not receiving the feedback information from the terminal, transmitting the (t+1)th slot sub-group by the second beam or the second beam group, or transmitting the (t+1)th slot sub-group by the first beam or the first beam group; and in a case of receiving the feedback information, fed back by the terminal, of transmitting the (t+1)th slot sub-group by a third beam or a third beam group, transmitting the (t+1)th slot sub-group by the third beam or the third beam group, wherein the third beam group includes a plurality of beams, and the plurality of beams are used for transmitting x3 slots in the slot sub-group, and x3 is a positive integer.

In some other embodiments, the operation S1006 may further include: receiving feedback information, fed back by the terminal, of changing or replacing the beams allocated for the slot sub-groups; changing or replacing, according to the feedback information, the beams allocated for the slot sub-groups; and transmitting the slot sub-groups by the changed or replaced beams.

In some other embodiments, operation S1004 may include: configuring a group of beams for the T slot sub-groups, wherein for the T slot sub-groups, polling is performed in the group of beams.

In the embodiment of the present disclosure, the operation S1006 may further include: receiving feedback information, fed back by the terminal, of changing or replacing the beams allocated for the slot sub-groups; changing or replacing, according to the feedback information, the beams allocated for the slot sub-groups; and transmitting the slot sub-groups according to the changed or replaced beams, wherein the changed or replaced beams are beams in the group of beams or beams other than the group of beams.

In some embodiments, operation S1006 may further include: receiving feedback information, fed back by the terminal, of removing one or more beams from the group of beams; removing the one or more beams from the group of beams according to the feedback information, wherein for un-transmitted slot subgroups in the aggregated slots, polling is performed in remaining beams of the group of beams; and according to the group of beams from which one or more beams have been removed, transmitting the un-transmitted slot subgroups in the aggregated slots.

In some other embodiments, the operation S1006 may further include: receiving feedback information, fed back by the terminal, of adding one or more beams to the group of beams; adding the one or more beams to the group of beams according to the feedback information, wherein for un-transmitted slot subgroups in the aggregated slots, polling is performed in the group of beams into which one or more beams have been added; and transmitting, according to the group of beams into which one or more beams have been added, the un-transmitted slot subgroups in the aggregated slots.

Embodiment 4

Figure 11:
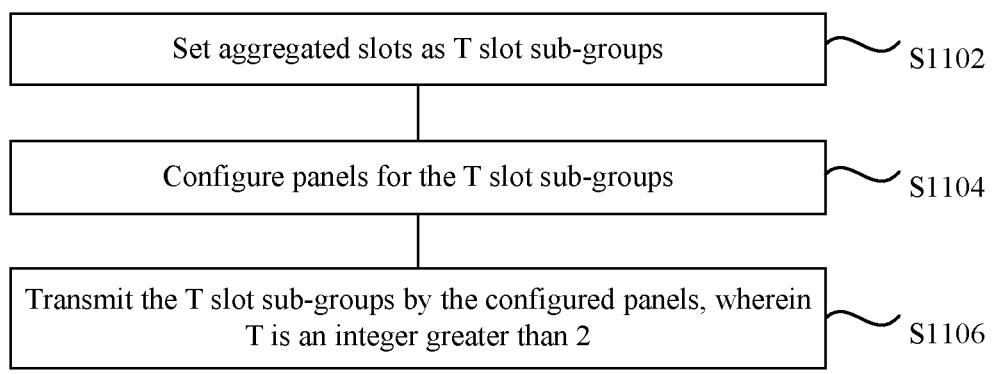
FIG. 11 is a flowchart III of a slot aggregation transmission method according to the embodiments of the present disclosure.

According to some other embodiments of the present disclosure, provided is a slot aggregation transmission method. FIG. 11 is a flowchart III of a slot aggregation transmission method according to the embodiments of the present disclosure, as shown in FIG. 11, the method includes the following operations.

In operation S1102, aggregated slots are set as T slot sub-groups.

In operation S1104, panels are configured for the T slot sub-groups.

In operation S1106, the T slot sub-groups are transmitted by the configured panels, wherein T is an integer greater than 2.

In some embodiments, the operation S1104 may include: configuring a first panel or a first panel group for the T slot sub-groups, wherein the first panel group includes a plurality of panels, and the plurality of panels are used for transmitting x1 slots in the slot sub-groups, and x1 is a positive integer.

In some embodiments, the operation S1106 may include: transmitting the T slot sub-groups by the configured first panel or first panel group.

In some other embodiments, the operation S1106 may further include: after transmitting the (t−1)th slot sub-group by the configured first panel or first panel group, receiving feedback information, fed back by the terminal, of transmitting the t-th slot sub-group by a second panel or a second panel group; configuring, according to the feedback information, the second panel or the second panel group for the t-th slot sub-group; and transmitting the t-th slot sub-group by the second panel or the second panel group, wherein the second panel group includes a plurality of panels, and the plurality of panels are used for transmitting x2 slots in the slot sub-group, where t is an integer greater than or equal to 1, and less than T, and x2 is a positive integer.

In some other embodiments, the operation S1106 may further include: if no feedback information is received from the terminal, transmitting the (t+1)th slot sub-group by the second panel or the second panel group, or transmitting the (t+1)th slot sub-group by the first panel or the first panel group; and if the feedback information, fed back by the terminal, of transmitting the (t+1)th slot sub-group by a third panel or a third panel group is received, transmitting the (t+1)th slot sub-group by the third panel or the third panel group, wherein the third panel group includes a plurality of panels, and the plurality of panels are used for transmitting x3 slots in the slot sub-group, and x3 is a positive integer.

In some other embodiments, the operation S1106 may further include: receiving feedback information, fed back by the terminal, of changing or replacing the panels allocated for the slot sub-groups; changing or replacing, according to the feedback information, the panels allocated for the slot sub-groups; and transmitting the slot sub-groups by the changed or replaced panels.

In some other embodiments, operation S1104 may include: configuring a group of panels for the T slot sub-groups, wherein for the T slot sub-groups, polling is performed in the group of panels.

In some other embodiments, the operation S1106 may further include: receiving feedback information, fed back by the terminal, of changing or replacing the panels allocated for the slot sub-groups; changing or replacing, according to the feedback information, the panels allocated for the slot sub-groups; and transmitting the slot sub-groups by the changed or replaced panels, wherein the changed or replaced panels are panels in the group of panels or panels other than the group of panels.

In some embodiments, operation S1106 may further include: receiving feedback information, fed back by the terminal, of removing one or more panels from the group of panels; removing the one or more panels from the group of panels according to the feedback information, wherein for un-transmitted slot subgroups in the aggregated slots, polling is performed in the remaining panels of the group of panels; and transmitting, according to the group of panels from which the one or more panels have been removed, the un-transmitted slot subgroups in the aggregated slots.

In some other embodiments, the operation S1106 may further include: receiving feedback information, fed back by the terminal, of adding one or more panels to the group of panels; adding the one or more panels to the group of panels according to the feedback information, wherein for un-transmitted slot subgroups in the aggregated slots, polling is performed in the group of panels into which one or more panels have been added; and according to the group of panels into which one or more panels have been added, transmitting the un-transmitted slot subgroups in the aggregated slots.

The slot aggregation in the case of multi-beam/multi-panel transmission in Embodiment 3 and Embodiment 4 is described in detail below.

For the multi-beam transmission, multi-slot aggregation transmission may be performed in the following manner.

Firstly, slot sub-groups of aggregated slots are determined or configured, and the slot sub-groups may be continuous slots or discrete slots.

Secondly, beams are configured for different slot sub-groups, or in other words, a quality control level (QCL) relationship is configured for a demodulation reference signal (DMRS) of each slot sub-group. As shown in Table 2, configuring the corresponding QCL relationship for the DMRS ports is actually equivalent to specifying a transmission beam.

TABLE 2

| | slot sub-group | | | |
|---|---|---|---|---|
| | slot sub-group 1 | slot sub-group 2 | slot sub-group 3 | slot sub-group 4 |
| transmission beam | beam a | beam a or b | beam a or b or c | beam a or b or c or d |

The beams a, b, c, and d may be pre-configured or determined according to the feedback of a receiving end. For example, when the base station side schedules the current slot aggregation transmission, the indicated beam is the beam a, and when the slot sub-group 1 is transmitted, the beam a is used for transmission.

When the slot sub-group 2 is transmitted, the base station receives a feedback from the UE, and learns that the best beam is the beam b, and the beam b may be the same as or different from the beam a. The slot sub-group 2 uses the beam b for transmission. If no new feedback is obtained, the transmission is performed according to beam a.

When the slot sub-group 3 is transmitted, the base station receives a feedback from the UE, and learns that the best beam is the beam c, and the beam c may be the same as or different from the beams a and b. The slot sub-group 3 uses the beam c for transmission. If no new feedback is obtained, transmission is performed according to the best beam fed back last time or the beam a.

When the slot sub-group 4 is transmitted, the base station receives a feedback from the UE, and learns that the best beam is beam d, and the beam d may be the same as or different from the beam a, the beam b, and the beam c. The slot sub-group 4 uses the beam d for transmission. If no new feedback is obtained, transmission is performed according to the best beam fed back last time or the beam a.

For the beams a, b, c and d, one beam may be expanded into a beam set formed by a plurality of beams. For detailed implementation, please refer to the following examples.

The beam a is expanded into a beam set A including a plurality of beams a1-ax1 which are respectively applied to x1 slots in a slot sub-group.

The beam b is expanded into a beam set B including a plurality of beams b1-bx2 which are respectively applied to x2 slots in a slot sub-group.

The beam c is expanded into a beam set C including a plurality of beams c1-cx3 which are respectively applied to x3 slots in a slot sub-group.

The beam d is expanded into a set of beams D including a plurality of beams d1-dx4 which are respectively applied to x4 slots in a slot sub-group.

In the examples, x1, x2, x3, x4 are positive integers.

There is a case in which no feedback is required. As shown in Table 3, the beams a, b, c and d have been determined when the slot aggregation transmission starts. In this way, the number of slots included in the slot sub-group may be configured flexibly, and the slot sub-group having a better transmission quality may be configured to have more slots.

TABLE 3

| | slot sub-group | | | |
|---|---|---|---|---|
| | slot sub-group 1 | slot sub-group 2 | slot sub-group 3 | slot sub-group 4 |
| transmission beam | beam a | beam b | beam c | beam d |

The terminal may monitor the quality of the beams a, b, c, and d by a reference signal, and when the transmission quality does not meet the requirements, it may be advised by means of the feedback to change or replace the corresponding beams.

As shown in table 4, there is a case where the base station is pre-configured with a group of beams Z, Z containing k beams z1-zk. Polling is performed in the k beams according to slot sub-groups, k being an integer greater than 1.

TABLE 4

| | slot sub-group | | | | | |
|---|---|---|---|---|---|---|
| | slot sub-group 1 | slot sub-group 2 | ... k | slot sub-group k + 1 | slot sub-group k + 2 | ... |
| transmission beam | beam z1 | beam z2 | ... beam zk | beam z1 | beam z2 | ... |

The terminal can report to request to remove or replace the beam zi. The replacement is simple, and the number of beams remains unchanged. As shown in Table 5, for example, after polling is performed once, the beam z2 is replaced with the beam z1, wherein i is an integer greater than 1.

TABLE 5

| | slot sub-group | | | | | |
|---|---|---|---|---|---|---|
| | slot sub-group 1 | slot sub-group 2 | ... k | slot sub-group k + 1 | slot sub-group k + 2 | ... |
| transmission beam | beam z1 | beam z2 | ... beam zk | beam z1 | beam z1 | ... |

The above beams may also be replaced with other beams that are not in the original k beams.

If the beams are removed, when polling is performed for subsequent beams, there is a need to perform polling according to (zk-p) beams, p being the number of beams removed, and p being an integer greater than 1.

For example, k=4, as shown in Table 6, the beam removed after the first polling is beam z2.

TABLE 6

| | slot sub-group | | | | | | |
|---|---|---|---|---|---|---|---|
| | slot sub-group 1 | slot sub-group 2 | slot sub-group 3 | slot sub-group 4 | slot sub-group 5 | slot sub-group 6 | slot sub-group 7 |
| transmission beam | beam z1 | beam z2 | beam z3 | beam z4 | beam z1 | beam z3 | beam z4 ... |

For another example, k=3, as shown in Table 7, the beams removed after the first polling are beam z2 and beam z3.

TABLE 7

| | slot sub-group | | | | | | |
|---|---|---|---|---|---|---|---|
| | slot sub-group 1 | slot sub-group 2 | slot sub-group 3 | slot sub-group 4 | slot sub-group 5 | slot sub-group 6 | slot sub-group 7 |
| transmission beam | beam z1 | beam z2 | beam z3 | beam z1 | beam z1 | beam z1 | beam z1 ... |

In addition to removing beams, beams may also be added. As shown in Table 8, for example, k=2, which is extended to k=4 after beams are added.

TABLE 8

| | slot sub-group | | | | | |
|---|---|---|---|---|---|---|
| | slot sub-group 1 | slot sub-group 2 | slot sub-group 3 | slot sub-group 4 | slot sub-group 5 | slot sub-group 6 |
| transmission beam | beam z1 | beam z2 | beam z1 | beam z2 | beam z3 | beam z4 ... |

For example, the predetermined polling mode for the two panels is shown in Table 9.

TABLE 9

| | slot sub-group | | | | | |
|---|---|---|---|---|---|---|
| | slot sub-group 1 | slot sub-group 2 | slot sub-group 3 | slot sub-group 4 | slot sub-group 5 | slot sub-group 6 |
| transmission panel | Panel 1 | Panel 2 | Panel 1 | Panel 2 | Panel 1 | Panel 2 ... |

In this process, if the receiving end finds that the transmission quality of panel 2 is very poor, resources can be released to panel 1. This is equivalent to replacing panel 2 with panel 1, as shown in Table 10.

TABLE 10

| | slot sub-group | | | | | | |
|---|---|---|---|---|---|---|---|
| | slot sub-group 1 | slot sub-group 2 | slot sub-group 3 | slot sub-group 4 | slot sub-group 5 | slot sub-group 6 | ... |
| transmission panel | Panel 1 | Panel 2 | Panel 1 | Panel 1 | Panel 1 | Panel 1 | ... |

Of course, panels may also be added or replaced, which is similar to the addition and replacement of beams, and is not described herein again.

Basically, in the case of multiple panels, the case of multiple transmission points (TP) is very similar to that of multiple beams, and can also be summarized as a configuration of a QCL relationship, and different panels can be regarded as a special case of different beams.

Through the above description of the embodiments, it should be clearly appreciated by the person skilled in the art that the method of the embodiments above may be implemented by means of software in connection with the required universal hardware platform, and of course, can also be implemented by hardware, but in many cases the former is a more exemplary implementation. Based on this understanding, the essence of the techniques or the contributions to current technologies under the present disclosure may be implemented in the form of software products. Such software product may be stored in one or more computer storage media (such as a Read-Only Memory (ROM), a Random Access Memory (RAM), a magnetic disk, or an optical disc, and include several instructions to request a terminal device (such as a cell phone, a personal computer, a server, or a network device) to implement methods of the embodiments.

Embodiment 5

In some embodiments of the present disclosure, provided is a slot aggregation device. The apparatus is used to implement the above embodiments and exemplary implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 12:
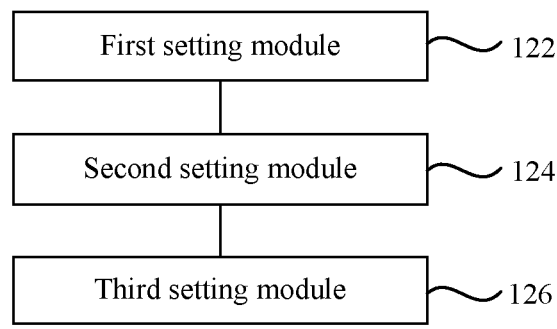
FIG. 12 is a block diagram of a slot aggregation transmission device according to the embodiments of the present disclosure.

FIG. 12 is a block diagram of a slot aggregation transmission device according to the embodiments of the present disclosure. As shown in FIG. 12, the device includes:

a first setting module 122 configured to set, in a time-slot aggregation process, one or more slot intervals in N slots, wherein a duration of one slot interval is one or more slots, and N is an integer greater than 1; or a second setting module 124 configured to set, in a time-slot aggregation process, N slots as continuous slots, wherein the number of resources allocated in an nth slot of the N slots is less than the number of resources allocated in an (n−1)th slot of the N slots, and n is less than or equal to N; or a third setting module 126 configured to set, in a time-slot aggregation process, N slots as X slot groups, wherein a transmission format of each slot group is pre-configured by a base station, and X is less than N.

In some embodiments, the first setting module 122 is further configured to set, in a slot aggregation process, M spaced sub-aggregation blocks in the N slots, wherein the slot intervals between the M sub-aggregation blocks are the same; or set, in a time-slot aggregation process, M spaced sub-aggregation blocks in the N slots, wherein a slot interval between an (m−2)th sub-aggregation block and an (m−1)th sub-aggregation block is less than a slot interval between the (m−1)th sub-aggregation block and an mth sub-aggregation block; or set, in a time-slot aggregation process, M spaced sub-aggregation blocks in the N slots, wherein the number of slots included in an (m−1)th sub-aggregation block is less than the number of slots included in an mth sub-aggregation block, m being less than or equal to M, and M being less than N.

In the embodiments of the present disclosure, the one or more slot intervals are used for receiving feedback information of a terminal in a process of transmitting aggregated slots to the terminal, so as to determine, according to the feedback information, to release or continue transmission of slots to be transmitted among the aggregated slots, wherein the feedback information is used for indicating whether the terminal successfully decodes the transmitted slots.

In some embodiments, resources of the one or more slot intervals are used for transmitting other transmission blocks or for scheduling other terminals other than a current terminal.

In some embodiments of the present disclosure, the resources include one of the following: time domain resources, frequency domain resources, power resources or space domain resources.

In some embodiments, the device further includes a transmission module, configured to transmit, before the aggregated slots are transmitted or each slot group is transmitted, a configured transmission format of each slot group to the terminal.

In some other embodiments, the device further includes: a first receiving sub-module, configured to receive, after an (x−1)th slot group is transmitted, a transmission format of an xth slot group or an (x+1)th slot group fed back by the terminal; a configuration sub-module, configured to configure the transmission format as a transmission format of the xth slot group or the (x+1)th slot, wherein x is an integer greater than 1.

Embodiment 6

Figure 13:
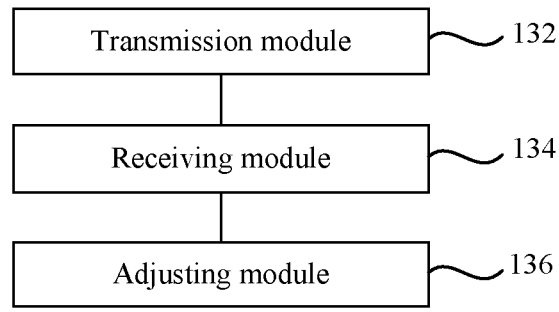
FIG. 13 is a block diagram I of a slot aggregation transmission device according to the embodiments of the present disclosure.

Some embodiments of the present disclosure provide a slot aggregation transmission device. FIG. 13 is a block diagram I of a slot aggregation transmission device according to the embodiments of the present disclosure. As shown in FIG. 13, the terminal includes: a transmission module 132, configured to transmit code block groups (CBGs) to a terminal on N slots after time-slot aggregation, wherein one or more slot intervals are set in the N slots after time-slot aggregation, a duration of one slot interval is one or more slots, N is an integer greater than 4, each CBG includes a plurality of code blocks (CBs), and different CBGs are transmitted by different resources within the slots; a receiving module 134, configured to receive, in the one or more slot intervals, feedback information from the terminal, wherein the feedback information received in a slot interval is used for indicating whether the terminal successfully decodes CBGs transmitted before the slot interval; and an adjusting module 136 configured to adjust, in a process of transmitting the CBGs and according to the feedback information, resources for transmitting CBGs on one or more slots after the slot interval.

In some embodiments, the device further includes: a setting sub-module, configured to set, in a slot aggregation process, the N slots as Y slot sub-groups, wherein each slot sub-group includes one or more slots, and the CBGs are transmitted by the Y slot sub-groups, where Y is an integer greater than 1 and less than or equal to N.

In some other embodiments, the device further includes: a second receiving sub-module, configured to receive, after transmission of the (y−1)th slot sub-group is completed, the feedback information from the terminal by the yth slot sub-group, wherein the feedback information is used for indicating whether the terminal successfully decodes the CBGs transmitted in the (y−1)th slot sub-group; and a first allocation module, configured to allocate, according to the feedback information, resources corresponding to successfully decoded CBGs in the (y+1)th slot sub-group to unsuccessfully decoded CBGs; or a second allocating module, configured to allocate, according to the feedback information, resources corresponding to successfully decoded CBGs in the (y+1)th slot sub-group to other terminals other than said terminal; or a third allocating module, configured to allocate, according to the feedback information, resources corresponding to successfully decoded CBGs in the (y+1)th slot sub-group to other transmission blocks (TBs).

In some embodiments, the first allocation module may be further configured to map the successfully decoded CBGs to resources corresponding to the successfully decoded CBGs; or perform coding adjustment on the unsuccessfully decoded CBGs, and then mapping the unsuccessfully decoded CBGs to the (y+1)th slot sub-group as a whole, wherein y is an integer greater than 1.

Embodiment 7

Figure 14:
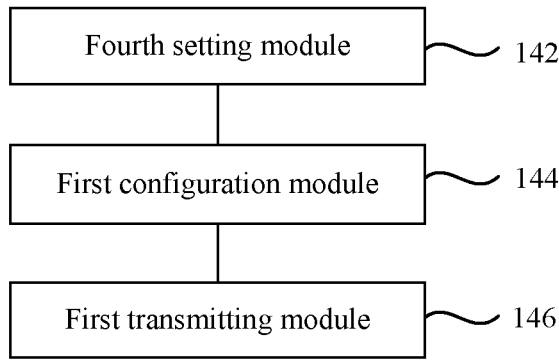
FIG. 14 is a block diagram II of a slot aggregation transmission device according to the embodiments of the present disclosure.

Some embodiments of the present disclosure provide a slot aggregation transmission device. FIG. 14 is a block diagram II of a slot aggregation transmission device according to the embodiments of the present disclosure. As shown in FIG. 14, the device includes: a fourth setting module 142, configured to set aggregation slots as T slot sub-groups; a first configuration module 144, configured to configure beams for the T slot sub-groups; and a first transmitting module 146, configured to transmit the T slot sub-groups by the configured beams, wherein T is an integer greater than 2.

In some embodiments, the first configuration module 144 is further configured to configure a first beam or a first beam group for the T slot sub-groups, wherein the first beam group includes a plurality of beams, and the plurality of beams are used for transmitting x1 slots in the slot sub-groups, and x1 is a positive integer.

In some embodiments, the first transmitting module 146 is further configured to transmit the T slot sub-groups by the configured first beam or first beam group.

In some other embodiments, the first transmitting module 146 is further configured to receive, after transmitting the (t−1)th slot sub-group by the configured first beam or first beam group, feedback information, fed back by the terminal, of transmitting the t-th slot sub-group by a second beam or a second beam group; configure, according to the feedback information, the second beam or the second beam group for the t-th slot sub-group; and transmit the t-th slot sub-group by the second beam or the second beam group, wherein the second beam group includes a plurality of beams, and the plurality of beams are used for transmitting x2 slots in the slot sub-group, where t is an integer greater than or equal to 1, and less than T, and x2 is a positive integer.

In some other embodiments, the first transmitting module 146 is further configured to transmit the (t+1)th slot sub-group by the second beam or the second beam group, or transmit the (t+1)th slot sub-group by the first beam or the first beam group if no feedback information is received from the terminal; and transmit the (t+1)th slot sub-group by the third beam or the third beam group if the feedback information, fed back by the terminal, of transmitting the (t+1)th slot sub-group by a third beam or a third beam group is received, wherein the third beam group includes a plurality of beams, and the plurality of beams are used for transmitting x3 slots in the slot sub-group, and x3 is a positive integer.

In some other embodiments, the first transmitting module 146 is further configured to receive feedback information, fed back by the terminal, of changing or replacing with a beam allocated by a slot sub-group; according to the feedback information, changing or replacing the beams allocated for the slot sub-groups; and transmit the slot sub-groups by the changed or replaced beams.

In some other embodiments, the first configuration module 144 is further configured to configure a group of beams for the T slot sub-groups, wherein for the T slot sub-groups, polling is performed in the group of beams.

In some embodiments, the first transmitting module 146 is further configured to receive feedback information fed back by the terminal for changing or replacing a beam allocated to a slot sub-group; according to the feedback information, changing or replacing the beams allocated for the slot sub-groups; and transmit the slot sub-groups according to the changed or replaced beams, wherein the changed or replaced beams are beams in the group of beams or beams other than the group of beams.

In some other embodiments, the first transmitting module 146 is further configured to receive feedback information, fed back by the terminal, of removing one or more beams from the group of beams; remove the one or more beams from the group of beams according to the feedback information, wherein for un-transmitted slot subgroups in the aggregated slots, polling is performed in remaining beams of the group of beams; and transmit, according to the group of beams from which one or more beams have been removed, the un-transmitted slot subgroups in the aggregated slots.

In some other embodiments, the first transmitting module 146 is further configured to receive feedback information, fed back by the terminal, of adding one or more beams to the group of beams; add the one or more beams to the group of beams according to the feedback information, wherein for un-transmitted slot subgroups in the aggregated slots, polling is performed in the group of beams into which one or more beams have been added; and transmit, according to the group of beams into which one or more beams have been added, the un-transmitted slot subgroups in the aggregated slots.

Embodiment 8

Figure 15:
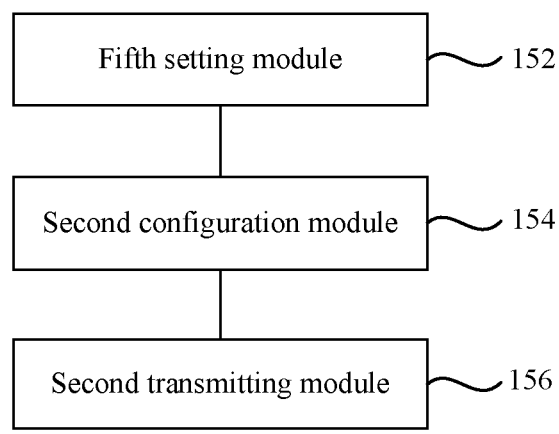
FIG. 15 is a block diagram III of a slot aggregation transmission device according to the embodiments of the present disclosure.

Some embodiments of the present disclosure provide a slot aggregation transmission device. FIG. 15 is a block diagram III of a slot aggregation transmission device according to the embodiments of the present disclosure. As shown in FIG. 15, the device includes: a fifth setting module 152, configured to set aggregated slots as T slot sub-groups; a second configuration module 154, configured to configure panels for the T slot sub-groups; a second transmitting module 156, configured to transmit the T slot sub-groups by the configured panels, wherein T is an integer greater than 2.

In some embodiments, the second configuration module 154 is further configured to configure a first panel or a first panel group for the T slot sub-groups, wherein the first panel group includes a plurality of panels, and the plurality of panels are used for transmitting x1 slots in the slot sub-groups, and x1 is a positive integer.

In some embodiments, the second transmitting module 156 is further configured to transmit the T slot sub-groups by the configured first panel or first panel group.

In some other embodiments, the second transmitting module 156 is further configured to receive, after transmitting the (t−1)th slot sub-group by the configured first panel or first panel group, feedback information, fed back by the terminal, of transmitting the t-th slot sub-group by a second panel or a second panel group; configure the second panel or the second panel group for the t-th slot sub-group according to the feedback information; and transmit the t-th slot sub-group by the second panel or the second panel group, wherein the second panel group includes a plurality of panels, and the plurality of panels are used for transmitting x2 slots in the slot sub-group, where t is an integer greater than or equal to 1, and less than T, and x2 is a positive integer.

In some other embodiments, the second transmitting module 156 is further configured to transmit the (t+1)th slot sub-group by the second panel or the second panel group, or transmit the (t+1)th slot sub-group by the first panel or the first panel group if no feedback information is received from the terminal; and transmit the (t+1)th slot sub-group by the third panel or the third panel group if the feedback information, fed back by the terminal, of transmitting the (t+1)th slot sub-group by a third panel or a third panel group is received, wherein the third panel group includes a plurality of panels, and the plurality of panels are used for transmitting x3 slots in the slot sub-group, and x3 is a positive integer.

In some other embodiments, the second transmitting module 156 is further configured to receive feedback information, fed back by the terminal, of changing or replacing the panels allocated for the slot sub-groups; change or replace, according to the feedback information, the panels allocated for the slot sub-groups; and transmit the slot sub-groups by the changed or replaced panels.

In some other embodiments, the second configuration module 154 is further configured to configure a group of panels for the T slot sub-groups, wherein for the T slot sub-groups, polling is performed in the group of panels.

In some embodiments, transmitting the T slot sub-groups by the configured panels includes: receiving feedback information, fed back by the terminal, of changing or replacing the panels allocated for the slot sub-groups; changing or replacing, according to the feedback information, the panels allocated for the slot sub-groups; and transmitting the slot sub-groups by the changed or replaced panels, wherein the changed or replaced panels are panels in the group of panels, or other panels other than the group of panels.

In some embodiments, the second transmitting module 156 is further configured to receive feedback information, fed back by the terminal, of adding one or more panels to the group of panels; remove the one or more panels from the group of panels according to the feedback information, wherein for un-transmitted slot subgroups in the aggregated slots, polling is performed in the remaining panels of the group of panels; and transmit, according to the group of panels from which the one or more panels have been removed, the un-transmitted slot subgroups in the aggregated slots.

In some other embodiments, the second transmitting module 156 is further configured to receive feedback information, fed back by the terminal, of adding one or more panels to the group of panels; add the one or more panels to the group of panels according to the feedback information, wherein for un-transmitted slot subgroups in the aggregated slots, polling is performed in the group of panels into which one or more panels have been added; and according to the group of panels into which one or more panels have been added, transmit the un-transmitted slot subgroups in the aggregated slots.

It should be noted that each module may be implemented by software or hardware. The latter may be implemented in the following manner, but is not limited thereto. All the modules are located in a same processor; or, the modules are located in different processors in an arbitrary combination.

Embodiment 9

The embodiments of the present disclosure provide a storage medium. The storage medium stores a computer program. The computer program is configured to execute the operations in any one of the method embodiments at runtime.

In the embodiments, the storage medium may be configured to store a computer program for executing the following operations. In operation S11, one or more slot intervals are set in N slots in a slot aggregation process, wherein a duration of one slot interval is one or more slots, and N is an integer greater than 1. Alternatively, in operation S12, N slots are set as continuous slots in a time-slot aggregation process, wherein the number of resources allocated in an nth slot of the N slots is less than the number of resources allocated in an (n−1)th slot of the N slots, and n is less than or equal to N. Alternatively, in operation S13, N slots are set as X slot groups in a time-slot aggregation process, wherein a transmission format of each slot group is pre-configured by a base station, and X is less than N.

In some embodiments, the storage medium may be configured to store a computer program for executing the following operations. In operation S21, code block groups (CBGs) are transmitted to a terminal on N slots after slot aggregation, wherein one or more slot intervals are set in the N slots after slot aggregation, a duration of one slot interval is one or more slots, N is an integer greater than 1, and each CBG includes a plurality of code blocks (CBs). In operation S22, feedback information from the terminal is received in the one or more slot intervals, wherein the feedback information received in a slot interval is used for indicating whether the terminal successfully decodes CBGs transmitted before the slot interval. In operation S23, in a process of transmitting the CBGs, resources for transmitting CBGs on one or more slots after the slot interval are adjusted according to the feedback information.

In some embodiments, the storage medium also may be configured to store a computer program for executing the following operations. In operation S31, aggregated slots are set as T slot sub-groups. In operation S32, beams are set for the T slot sub-groups. In operation S33, the T slot sub-groups are transmitted by the configured beams, wherein T is an integer greater than 2.

In some exemplary embodiments, the storage medium may include, but is not limited to, any medium that can store a computer program, such as a USB flash drive, a Read-Only Memory (ROM for short), a Random Access Memory (RAM for short), a removable hard disk, a magnetic disk, or an optical disc.

Embodiment 10

Some embodiments of the present disclosure provide an electronic device, including a memory and a processor, wherein the memory stores a computer program, and the processor is configured to run the computer program, so as to execute the operations in any one of the method embodiments.

In some exemplary embodiments, the electronic device may further include a transmission apparatus and an input/output apparatus, wherein the transmission apparatus is connected to the processor, and the input/output apparatus is connected to the processor.

In the embodiments, the processor may be configured to execute the following operations by using a computer program. In operation S11, one or more slot intervals are set in N slots in a slot aggregation process, wherein a duration of one slot interval is one or more slots, and N is an integer greater than 1. Alternatively, in operation S12, N slots are set as continuous slots in a time-slot aggregation process, wherein the number of resources allocated in an nth slot of the N slots is less than the number of resources allocated in an (n−1)th slot of the N slots, and n is less than or equal to N. Alternatively, in operation S13, N slots are set as X slot groups in a time-slot aggregation process, wherein a transmission format of each slot group is pre-configured by a base station, and X is less than N.

In some embodiments, the processor may be configured to execute the following operations by using a computer program. In operation S21, code block groups (CBGs) are transmitted to a terminal on N slots after slot aggregation, wherein one or more slot intervals are set in the N slots after slot aggregation, a duration of one slot interval is one or more slots, N is an integer greater than 1, and each CBG includes a plurality of code blocks (CBs). In operation S22, feedback information from the terminal is received in the one or more slot intervals, wherein the feedback information received in a slot interval is used for indicating whether the terminal successfully decodes CBGs transmitted before the slot interval. In operation S23, in a process of transmitting the CBGs, resources for transmitting CBGs on one or more slots after the slot interval are adjusted according to the feedback information.

In some embodiments, the processor may be configured to execute the following operations by using a computer program. In operation S31, aggregated slots are set as T slot sub-groups. In operation S32, beams are set for the T slot sub-groups. In operation S33, the T slot sub-groups are transmitted by the configured beams, wherein T is an integer greater than 2.

Alternatively, for specific examples in this embodiment, reference may be made to the examples described in the foregoing embodiments and exemplary embodiments, and details are not repeatedly described herein in this embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A slot aggregation transmission method, comprising:
setting aggregated slots as T slot sub-groups;
configuring beams for the T slot sub-groups; and
transmitting the T slot sub-groups by the configured beams, wherein T is an integer greater than 2.

2. The method according to claim 1, wherein configuring the beams for the T slot sub-groups comprises:
setting a first beam or a first beam group for the T slot sub-groups, wherein the first beam group comprises a plurality of beams, and the plurality of beams are used for transmitting x1 slots in the slot sub-groups, and x1 is a positive integer.

3. The method according to claim 2, wherein transmitting the T slot sub-groups by the configured beams comprises:
transmitting the T slot sub-groups by the configured first beam or first beam group.

4. The method according to claim 3, wherein transmitting the T slot sub-groups by the configured beams comprises:
after transmitting the (t−1)th slot sub-group by the configured first beam or first beam group, receiving feedback information, fed back by the terminal, of transmitting the t-th slot sub-group by a second beam or a second beam group;
configuring, according to the feedback information, the second beam or the second beam group for the t-th slot sub-group; and
transmitting the t-th slot sub-group by the second beam or the second beam group, wherein the second beam group comprises a plurality of beams, and the plurality of beams are used for transmitting x2 slots in the slot sub-group, where t is an integer greater than or equal to 1, and less than T, and x2 is a positive integer.

5. The method according to claim 4, wherein transmitting the T slot sub-groups by the configured beams comprises:
in a case of not receiving the feedback information from the terminal, transmitting the (t+1)th slot sub-group by the second beam or the second beam group, or transmitting the (t+1)th slot sub-group by the first beam or the first beam group; and
in a case of receiving the feedback information, fed back by the terminal, of transmitting the (t+1)th slot sub-group by a third beam or a third beam group, transmitting the (t+1)th slot sub-group by the third beam or the third beam group, wherein the third beam group comprises a plurality of beams, and the plurality of beams are used for transmitting x3 slots in the slot sub-group, and x3 is a positive integer.

6. The method according to claim 1, wherein transmitting the T slot sub-groups by the configured beams comprises:
receiving feedback information, fed back by the terminal, of changing or replacing the beams allocated for the slot sub-groups;
changing or replacing, according to the feedback information, the beams allocated for the slot sub-groups; and
transmitting the slot sub-groups by the changed or replaced beams.

7. The method according to claim 1, wherein configuring the beams for the T slot sub-groups comprises:
configuring a group of beams for the T slot sub-groups, wherein for the T slot sub-groups, polling is performed in the group of beams.

8. The method according to claim 7, wherein transmitting the T slot sub-groups by the configured beams comprises:
receiving feedback information, fed back by the terminal, of changing or replacing the beams allocated for the slot sub-groups;
changing or replacing, according to the feedback information, the beams allocated for the slot sub-groups; and
transmitting the slot sub-groups according to the changed or replaced beams, wherein the changed or replaced beams are beams in the group of beams or beams other than the group of beams;
or,
transmitting the T slot sub-groups by the configured beams comprises:
receiving feedback information, fed back by the terminal, of removing one or more beams from the group of beams;
removing the one or more beams from the group of beams according to the feedback information, wherein for un-transmitted slot sub-groups in the aggregated slots, polling is performed in remaining beams of the group of beams; and
transmitting, according to the group of beams from which one or more beams have been removed, the un-transmitted slot sub-groups in the aggregated slots;
or,
transmitting the T slot sub-groups by the configured beams comprises:
receiving feedback information, fed back by the terminal, of adding one or more beams to the group of beams;
adding the one or more beams to the group of beams according to the feedback information, wherein for un-transmitted slot sub-groups in the aggregated slots, polling is performed in the group of beams into which one or more beams have been added; and
transmitting, according to the group of beams into which one or more beams have been added, the un-transmitted slot sub-groups in the aggregated slots.

9. A slot aggregation transmission device, comprising a memory storing instructions and a processor in communication with the memory, wherein the processor is configured to execute the instructions to perform the method according to claim 1.

* * * * *